(12) United States Patent
Konda et al.

(10) Patent No.: US 8,784,971 B2
(45) Date of Patent: Jul. 22, 2014

(54) DECORATED PRINTED MATTER AND MANUFACTURING METHOD THEREOF

(75) Inventors: Akinobu Konda, Kanagawa (JP); Yuji Ohta, Kanagawa (JP)

(73) Assignee: Create Kabushikigaisha, Kanagawa (JP)

( * ) Notice: Subject to any disclaimer, the term of this patent is extended or adjusted under 35 U.S.C. 154(b) by 503 days.

(21) Appl. No.: 13/084,871

(22) Filed: Apr. 12, 2011

(65) Prior Publication Data

US 2011/0274881 A1    Nov. 10, 2011

(30) Foreign Application Priority Data

May 7, 2010   (JP) .................................. 2010-107080
Jan. 13, 2011  (JP) .................................. 2011-004456

(51) Int. Cl.
  *B32B 3/00*  (2006.01)
  *B32B 5/16*  (2006.01)

(52) U.S. Cl.
  USPC ........... 428/162; 428/163; 428/164; 428/172; 428/206; 428/207; 428/542.2; 428/913

(58) Field of Classification Search
  USPC .............. 428/162–164, 172, 206, 207, 542.2, 428/913
  See application file for complete search history.

(56) References Cited

U.S. PATENT DOCUMENTS

| | | | | |
|---|---|---|---|---|
| 4,074,034 A | * | 2/1978 | Soga et al. | 525/386 |
| 5,629,068 A | * | 5/1997 | Miekka et al. | 428/148 |
| 2008/0009412 A1 | * | 1/2008 | Funada et al. | 503/200 |
| 2008/0213546 A1 | | 9/2008 | Murata et al. | |

FOREIGN PATENT DOCUMENTS

| | | |
|---|---|---|
| JP | 1-127336 A | 5/1989 |
| JP | 6-087300 A | 3/1994 |
| JP | 9-039192 A | 2/1997 |
| JP | 2000-135756 A | 5/2000 |
| JP | 2001-001444 A | 1/2001 |
| JP | 2002-052681 A | 2/2002 |
| JP | 2006255894 A | 9/2006 |
| JP | 2009-214546 A | 9/2009 |
| JP | 2009-255373 A | 11/2009 |

* cited by examiner

*Primary Examiner* — Donald J Loney
(74) *Attorney, Agent, or Firm* — Carrier Blackman & Associates, P.C.; Joseph P. Carrier; William D. Blackman

(57) ABSTRACT

To prepare a decorated printed matter, which excels in the visibility of the spin line or hairline pattern and which gives an appropriate metallic luster. A decorated printed matter which comprises: a plastic plate 1 with a light permeability, the plastic plate 1 is made of poly carbonate and is provided a convexo-concave pattern consists of a plurality of fine grooves 2 in the form of spin line on a rear-side surface 1*b* thereof; an ink coating 3 covering the convexo-concave pattern; and the ink coating 3 is formed by removing a solvent from an ink composition coated on the rear-side surface 1*b* of the plastic plate, the ink composition includes a carbon black and a binder; the average ratio of carbon black to binder is determined such that the distribution of the black pigment in the ink coating becomes the distribution by which an incident light incoming into the resin substrate from the front-side surface thereof reflects at an interface between the resin substrate and the ink coating.

10 Claims, 3 Drawing Sheets

DECORATED PRINTED MATTER AND MANUFACTURING METHOD THEREOF

BACKGROUND OF THE INVENTION

1. Field of the Invention

This invention relates to a decorated printed matter and manufacturing method thereof.

2. Description of Relevant Art

It is well-known that a decorated printed matter with a massive and expensive looking is obtained through following steps: forming a spin line or hairline pattern on a substrate made of aluminum (aluminum substrate) by a surface treatment; and coloring (by printing or dyeing) the aluminum substrate after the alumite treatment of the substrate.

When a nameplate etc. are made from the decorated printed matter by a blanking press, the fanciness of the nameplate may be spoiled since aluminum is exposed at the edge of the name plate and the edge of the name plate glitters in the light etc.

Also, since the coloring of the surface of the aluminum substrate is made, the appearance of the surface of the nameplate may be blurred white. In such a case, since the degree of the jet-blackness of the nameplate becomes low if the coloring is made using a black ink etc., the massive and expensive looking cannot be given even if the spin line or hairline pattern is provided on the surface.

In recent year, there have been used a substrate made of resin (e.g. a plastic substrate) instead of aluminum substrate. In such a case, the decorated printed matter is obtained through following steps: forming a spin line or hairline pattern on the front-side surface of the plastic substrate by a surface treatment or an ultraviolet stamping; and coloring (by printing or painting) the rear-side surface of the plastic substrate.

As an example of such decorated printed matter, the decorated printed matter disclosed in Japanese unexamined patent publication No. 2006-255894 has been found.

In such decorated printed matter, however, the surface treatment to form a convexo-concave pattern in the form of spin line or hairline is directly provided on the surface of the plastic substrate. Hereinafter, this pattern is referred to as "a convexo-concave pattern of spine line or hairline".

If the convexo-concave pattern of spin line or hairline that is exposed on the surface is damaged, the visibility of the convexo-concave pattern of spin line or hairline becomes worse. That is, there was a problem in the damage-resistant of the decorated printed matter.

Also, such decorated printed matter cannot give a metallic luster which is given when the convexo-concave pattern of spin line or hairline is formed on the surface of the metallic material (aluminum substrate) and which gives a different brightness in accordance with the directions looking. That is, there exists a problem that the sufficient metallic luster of the decorated printed matter is not given.

On the contrary, when the pattern of spin line or hairline is formed by the ultraviolet stamping, the resistance against the damage and abrasion of the concavo-concave pattern is superior to that of the concavo-concave pattern formed by the surface treatment. Thus, the problems described above are not remarkably caused, but the problem in the metallic luster was not improved.

Therefore, the decorated printed matter, which excels in the visibility of the pattern of spin line or hairline and which gives an appropriate metallic luster, has been required.

SUMMARY OF THE INVENTION

The present invention relates to a decorated printed matter comprising:

a resin substrate with a light permeability, the resin substrate has a convexo-concave pattern, which consists of a plurality of grooves, on a rear-side surface thereof; and an ink coating covering the convexo-concave pattern;

the convexo-concave pattern is visible from a front-side of the resin substrate, wherein the ink coating is formed by removing a solvent from an ink composition coated on the rear-side surface of the resin substrate, the ink composition includes a color pigment as colorant and a binder as adhesive, and wherein a ratio of the color pigment to the binder is determined such that the distribution of the color pigment in the ink coating becomes the distribution by which an incident light incoming into the resin substrate from the front-side surface thereof reflects at an interface between the resin substrate and the ink coating.

According to this invention, the particle of the color pigment is compactly located in line along the groove which forms the convexo-concave pattern on the rear-side surface of the resin substrate. Thereby, a reflection surface of an incident light that comprises the black pigment is formed on the rear-side surface of the resin substrate. Therefore, the incident light incoming into the resin substrate from the front-side surface thereof is certainly reflected at an interface between the resin substrate and the ink coating, and the reflected incident light is directed to the front-side surface of the resin substrate.

Thus, the convexo-concave pattern can be visible within the colored background by color pigment when looking the resin substrate from the side of the front-side surface. Also, the reflection at the interface between the resin substrate and the ink coating contributes to the improvement of the visibility of the convexo-concave pattern. Furthermore, the visibility of the convexo-concave pattern varies largely according to the incident direction of the incident light incoming into the resin substrate. Therefore, the convexo-concave pattern which gives a different brightness in accordance with the directions looking, and thus the decorated printed matter which gives a sufficient metallic luster can be given.

DETAILED DESCRIPTION OF THE PREFERRED EMBODIMENT

The detailed explanation of a decorated printed matter of the present invention will be given.

The decorated printed matter of the present invention is obtained through following steps: a step of forming a convexo-concave pattern of spin line or hairline that consists of extra-fine grooves, hereinafter "extra-fine grooves" is referred to as "fine grooves"; and a step of drying an ink composition which includes a carbon black as colorant and is coated on the rear-side surface 1b of the plastic plate 1.

[Plastic Plate]

A plastic plate 1 (resin substrate) is a sheet-like shaped molding (substrate) formed of a plastic material. The plastic material consists of one of a polycarbonate (PC), polystyrene (PS), polyethylene terephthalate (PET), and acrylate (PMMA), or includes at least one of a polycarbonate (PC), polystyrene (PS), polyethylene terephthalate (PET), and acrylate (PMMA), as a major ingredient.

Here, the thickness of the plastic plate 1 is preferably equal to or more than 50 micrometer. If the thickness is below 50 micrometer, the wrinkling or breakage of the plastic plate 1 may be caused when forming the convexo-concave pattern, which consists of fine grooves, on one side surface of the plastic plate 1.

A sheet-like shaped substrate, which is made of polycarbonate and is available in the market, is for example "panlite (Registered trademark)" of TEIJIN CHEMICALS LTD., "iupiron (Registered trademark)" of MITSUBISHI GAS CHEMICAL COMPANY, INC., and "lexan (registered trademark)" of ASAHI GLASS CO., LTD.

A sheet-like shaped substrate, which is made of polystyrene and is available in the market, is for example a polystyrene sheet of TOYO STYRENE CO., LTD. A sheet-like shaped substrate, which is made of polyethylene terephthalate and is available in the market, is for example "lunirror (Registered trademark)" of Toray Industries, Inc. A sheet-like shaped substrate, which is made of polymethyl methacrylate and is available in the market, is for example "acrylite (Registered trademark)" of MITSUBISHI RAYON CO., LTD.

[Surface Treatment]

Figure 1A:
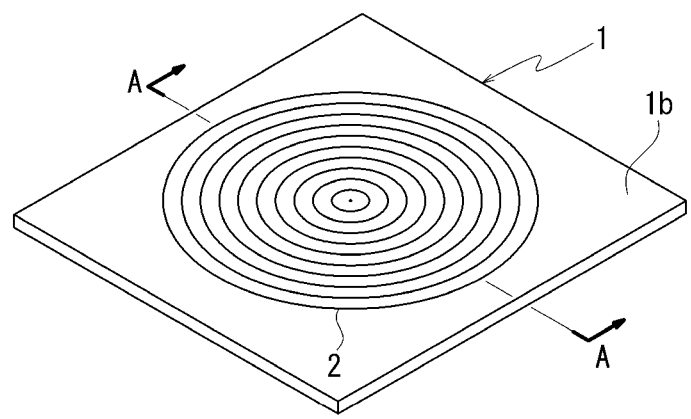
FIG. 1 is an explanatory view of fine grooves configuring the convexo-concave pattern on the plastic plate (resin substrate) of the decorated printed matter.
Figure 1B:
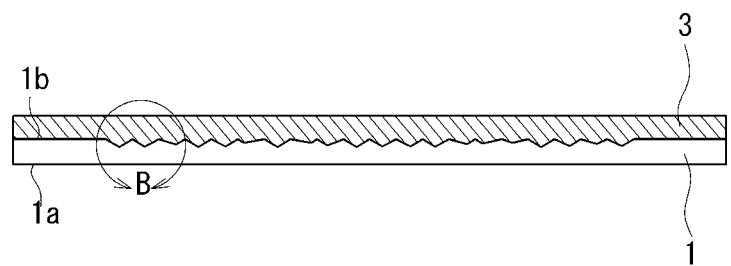
Figure 1C:
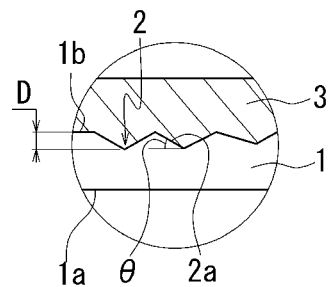

In FIG. 1, fine grooves which configure the convexo-concave pattern in the plastic plate 1 of the decorated printed matter are explained. FIG. 1A is a perspective view looking the plastic plate 1, which has a pattern of spin line or hairline of the fine grooves, from the side of the rear-side surface 1b. FIG. 1B is a sectional view along line A-A of FIG. 1A and shows the decorated printed matter which is obtained by providing the ink coating 3 on the rear-side surface 1b of the plastic plate 1. FIG. 1C is a partially enlarged view of the region B of FIG. 1B and explaining the shape of a cross-section of the fine grooves 2.

The surface treatment of the plastic plate 1 will be explained as an example of the case of the spin line pattern is provided on one side surface of the plastic plate 1. Here, the spin line pattern is a pattern formed by placing concentric circular grooves of different diameters.

As shown in FIG. 1A, the surface treatment is made on one side surface (rear-side surface 1b) of the sheet-like shaped plastic plate 1. Thus, a spin line pattern which consists of fine grooves 2 is formed on one side surface 1b.

The surface treatment is made by rubbing sandpaper or a metallic brush against the plastic plate 1. Here, fine grooves 2 of the hairline pattern are also formed by the same manner.

As shown in FIGS. 1B and 1C, the cross-sectional shape of the fine grooves 2 is V-shape whose pointed top thereof is located at the bottom. The width of the fine grooves 2 becomes wide towards the rear-side surface 1b of the plastic plate 1 in the thickness direction of the plastic plate 1. The ends at the rear-side surface 1b of each fine groove 2 continue to the ends of adjacent fine grooves 2. Thereby, in the rear-side surface 1b of the plastic plate 1, the concave portion of the V-shaped fine groove 2 and the convex portion of the reverse V-shaped part between adjacent fine grooves 2 are alternately disposed.

Each fine groove 2 is formed so that each fine groove 2 has a different depth and a cross-sectional shape. The average depth D of the fine groove 2 is preferably within the range of 0.05 to 25 micrometer.

When the depth becomes shallow than 0.05 micrometer, the visibility of the spin line pattern becomes worse. When the depth becomes deep than 25 micrometer, the ink composition is not fully filled in the fine grooves 2 and thereby a space to which the ink composition is not filled may remain in the fine grooves 2.

Here, if space remains within the fine grooves 2, the gap is caused at the interface between the rear-side surface 1b of the plastic plate 1 and the ink coating 3. In such a case, the incident light incoming into the plastic plate 1 is not reflected at the interface between the rear-side surface 1b of the plastic plate 1 and the ink coating 3. Thereby, the visibility of the spin line pattern when looking the plastic plate 1 from the front-side surface 1a becomes worse.

The average angle θ of the slanting surface 2a of the fine groove 2 with respect to the plane (rear-side surface 1b) of the plastic plate 1 is preferably within the range of 0.5 degree to 36 degree. By determining the angle θ within such range, the reflection surface of the light that comprises a carbon black is formed at the interface between the rear-side surface 1b of the plastic plate 1 and the ink coating 3. It is generally known and will be understood that before being added to the ink composition, carbon black has a non-metallic appearance.

In this case, almost all of the incident light incoming into the plastic plate 1 from the front-side surface 1a thereof is reflected at the interface between the rear-side surface 1b of the plastic plate 1 and the ink coating 3. Thereby, the incident light is directed to the front-side surface 1a of the plastic plate 1. Thus, the visibility of the spin line pattern, when looking from the front-side surface 1a of the plastic plate 1, is improved and thereby the value and ratio of brightness is improved.

The amount of the light, which is directed to the front-side surface 1a of the plastic plate 1 by the reflection at the interface between the rear-side surface 1b and the ink coating 3, decrease appreciably, if the angle θ exceeds 36 degree. In this case, the visibility of the spin line pattern when looking the plastic plate 1 from the front-side surface 1a becomes worse. Thereby, the value and ratio of brightness is deteriorated.

Furthermore, if the angle θ exceeds 36 degree, the ink composition is not fully filled in the fine groove 2 and the space may be caused in the fine grooves 2 when the ink composition is coated on the rear-side surface 1b of the plastic plate 1. In this case, the reflection surface of the light that comprises a carbon black is not compactly formed at the rear-side surface 1b of the plastic plate 1. Thereby, the amount of the light, which is directed to the front-side surface 1a of the plastic plate 1, decrease further and thus the visibility of the spin line pattern becomes much worse.

Also, it is preferable that the slanting surface 2a of the fine groove 2 that is a contact interface with the ink coating 3 is a smooth-surface so that the incident light which comes in contact with the ink coating 3 is not diffused at the contact interface. If the convexo-concave pattern exists on the surface 2a, the incident light is diffused at the interface with the ink coating 3. In this case, the amount of the light, which is finally directed to the front-side surface 1a of the plastic plate 1, decreases and thus the visibility of the spin line pattern becomes much worse.

[Ink Composition]

The ink coating 3 of the decorated printed matter is formed by removing a solvent from an ink composition after coating the rear-side surface 1b, which has the convexo-concave pattern comprising fine grooves 2, with the ink composition. As seen in FIGS. 1B and 1C, a rear surface of the ink coating 3, spaced away from the resin substrate, is uncovered and open to the environment.

The ink composition includes mainly a pigment as a colorant, a binder as an adhesive, and a mixed solvent. Here, the mixed solvent includes soluble solvent and insoluble solvent. The plastic plate is soluble in soluble solvent and is not soluble in insoluble solvent.

In this embodiment, the ink composition is prepared by adding a predetermined ratio of carbon black and dilution solvent to "STR conc 710 black (product name)" of the SEIKO ADVANCE LTD.

Figure 2A:
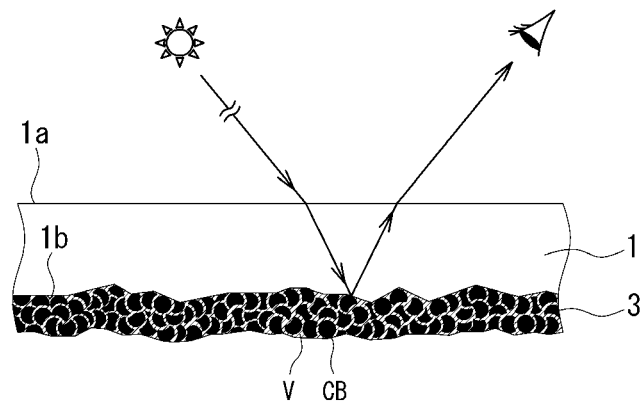
FIG. 2 is a view of explaining the visibility of the convexo-concave pattern and the reflection of the incident light at the surface of the ink coating covering the convexo-concave pattern.

In FIG. 2, the reflection of the incident light incoming into the plastic plate 1 from the surface 1a thereof at the interface between the plastic plate 1 and the ink coating 3 is explained. FIG. 2A is an explanatory view in case of: the distribution of the carbon black in the ink coating 3 which is obtained by removing the solvent from the ink composition is the distribution by which the incident light incoming into the plastic plate 1 from the surface 1a thereof is reflected at the interface between the plastic plate 1 and the ink coating 3.

Figure 2B:
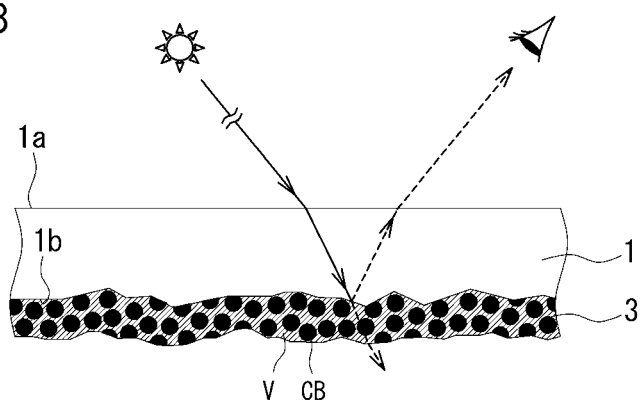

FIG. 2B is an explanatory view in case of: the ratio of carbon black to binder in the ink composition (or ink coating 3) becomes smaller than the ratio in the case of FIG. 1A, and the distribution of carbon black in the ink composition is the distribution by which part of the incident light incoming into the plastic plate 1 from the surface 1a thereof is not reflected at the interface between the plastic plate 1 and the ink coating 3 and enters into the inside of the ink coating 3.

Figure 2C:
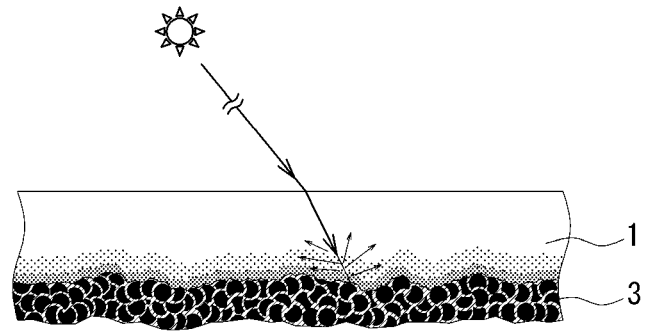

FIG. 2C is an explanatory view in case of: the convexo-concave pattern, which consists of fine grooves 2, of the plastic plate 1 is spoiled before the ink coating 3 is formed by removing the solvent from the ink composition covering the rear-side surface 1b due to the influence of the solvent included in the ink composition.

In this embodiment, since the pigment incorporated in the STR conc 710 black (product name) is a carbon black, the carbon black (MA8: primary particle size is 20 nanometer, the degree of the blackness of PVC resin is 20, and manufactured by MITSUBISHI CHEMICAL CORPORATION) is used as the carbon black added to the STR conc 710 black.

The primary particle size of carbon black can be selected within the range of 10 to 50 nanometers, as appropriate. For example the carbon black (MA100: primary particle size is 20 nanometer, the degree of the blackness of PVC resin is 10, and manufactured by MITSUBISHI CHEMICAL CORPORATION) or the carbon black (#95: primary particle size is 40 nanometer, the degree of the blackness of PVC resin is 2, and manufactured by MITSUBISHI CHEMICAL CORPORATION) may be used.

If the primary particle size of the carbon black exceeds nanometers, the particle of the carbon black is not sufficiently and densely filled in the fine groove 2 of the plastic plate 1. In such a case, the distribution of the carbon black at the region covering the convexo-concave pattern of the ink coating 3 may be less dense. In other words, the density of the carbon black becomes low.

[Binder]

A resin, which excels in adhesiveness to the plastic plate 1, is selected as resin in accordance with the types of the plastic plate, as appropriate. A vinyl or acrylic resin which excels in adhesiveness to the polycarbonate (PC) is adopted in the STR conc 710 black (product name).

Here, in the ink composition, it is preferable that the average ratio C of carbon black to binder (average ratio of carbon black/binder) is equal to or more than 0.27 ($0.27 \leq C$). More preferably, the ratio C is within the range of equal to or more than 0.50 to equal to or not more than 1.40 ($0.50 \leq C \leq 1.40$). Further preferably, the ratio C is within the range of equal to or more than 0.77 to equal to or not more than 1.33 ($0.77 \leq C \leq 1.33$).

In this case, if the ratio C is within the above described range, as shown in FIG. 2A, the distribution of the particle of carbon black CB becomes dense at the interface between the plastic plate 1 and the ink coating 3. That is, the density of the carbon black becomes high. Thus, the particle of the black pigment is located with a high density in a line along the grooves 2 which forms the convexo-concave pattern on the rear-side surface 1b of the plastic plate 1.

Thereby, the incident light incoming into the plastic plate 1 from the front-side surface 1a thereof is certainly reflected at the interface between the plastic plate 1 and the ink coating 3, and is directed to the front-side surface 1a of the plastic plate 1. Thus, when looking the plastic plate 1 from the front-side surface 1a, the convexo-concave pattern can be visible within the jet-black background by the carbon black CB by the reflected incident light.

This reflection at the interface varies significantly in accordance with the incident angle with respect to the plastic plate 1 of the incident light. Thus, the convexo-concave pattern gives a different appearance with a different brightness when looking the plastic plate 1 from different directions. Thereby, the visibility of the convexo-concave pattern which gives an appropriate different metallic luster on the decorated printed matter is improved.

Since the degree of the jet-blackness of the decorated printed matter becomes low if the average ratio of the carbon black to the binder resin is less than 0.27, the visibility of the convexo-concave pattern which consists of fine grooves 2 becomes worse.

Further, as shown in FIG. 2B, the distribution of the carbon black CB at the interface between the plastic plate 1 and the ink coating 3 becomes less dense if the average ratio of the carbon black to the binder resin is less than 0.27. In other words, the density of the carbon black becomes low. In such a case, since a part of the incident light incoming into the plastic plate 1 from the front-side surface 1a thereof is not reflected at the interface between the plastic plate 1 and the ink coating 3, a part of the incident light enters into the ink coating 3.

In this case, the amount of the light, which is directed to the front-side surface 1a of the plastic plate 1 by the reflection, decreases and thus the visibility of the convexo-concave pattern (pattern in the form of spin line or hairline) which consists of fine grooves 2 becomes worse.

Also, if the ratio of carbon black to binder exceeds 1.40, the strength of the ink coating within the decorated printed matter becomes worse.

[Mixed Solvent]

The mixed solvent is a mixture of a soluble solvent and an insoluble solvent. The plastic plate is soluble in the soluble solvent and is not soluble in the insoluble solvent.

In the "STR conc 710 black (product name)", ethylene glycol monobutyl ether (insoluble solvent) and cyclohexanone (soluble solvent) are included. Here, the solubility of the plastic plate (polycarbonate) to the ethylene glycol monobutyl ether is low and the solubility of the plastic plate (polycarbonate) to the cyclohexanone is high. The average ratio of soluble solvent to insoluble solvent (soluble solvent/insoluble solvent) is 0.42.

[Dilution Solvent]

The dilution solvent is added to adjust the fluidity of the ink composition which is obtained by adding the carbon black to the "STR conc 710 black (product name)".

Also, the dilution solvent is added for controlling the composition of the solvent to the composition by which the pattern of the spin line or hairline is not spoiled, during the predetermined period of time, due to the dissolution by the solvent of the fine groove 2 of the plastic plate 1. Here, the predetermined period of time is from the coating of the ink composition on the plastic plate 1 to the removal of the solvent in the ink composition covering the rear-side surface 1b.

Therefore, it is preferable that the solvent (insoluble solvent), to which the plastic plate 1 is slightly-soluble and by which a whitening, devitrification, crack and swelling of the plastic plate 1 is rarely caused, is adopted as the dilution solvent.

This is because the diffused reflection of the light is caused at the interface between the plastic plate 1 and the ink coating 3, if the fine groove 2 of the plastic plate 1 is dissolved and thereby V-shaped cross-section of the fine groove 2 is spoiled.

Also, the whitening and devitrification cause the diffusion of the light reflected at the interface. The crack and the swelling disappears the convexo-concave pattern of fine grooves 2.

In this embodiment, the solvent by which changes, such as whitening, devitrification, crack, and swelling, are not caused on the plastic plate 1 is selected through the experiment as the insoluble solvent. Here, this experiment comprising steps of: dropping a droplet (1 ml, 20 mmφ) of the solvent at room temperature on the surface, to which the convexo-concave pattern of the fine grooves 2 are formed, of the plastic plate 1; removing the droplet of the solvent by natural drying.

Here, it is judged that the glaring is caused, when the gloss of the re-solidified portion of the plastic plate 1 that is formed by removing the solvent from the dissolved portion dissolved by the solvent of the plastic plate 1 is different from the gloss of the plastic plate 1.

The solvent satisfying these requirements, for example, glycol ether series solvent such as, ethylene glycol monobutyl ether (butyl cellosolve), ethylene glycol monoethyl ether (ethyl cellosolve), diethylene glycol monomethyl ether, triethylene glycol monomethyl ether, propylene glycol monomethyl ether, 3-methoxy-3-methyl-1-butanol, and cyclic hydrocarbon series solvent such as cyclohexane and ethylcyclohexane are selectable as the insoluble solution.

Here, the dilution solvent may be one solvent selected from among above described solvents, or may be at least any one of above described solvents.

Also, the solvent which dose not satisfy the above described requirement is soluble solvent. In this embodiment, Cyclohexanone, 1,3,5-trimethylbenzene, 1,2,4-trimethylbenzene, isophorone, butyl acetate, toluene, xylene, cumene, and ethyl benzene are selectable as soluble solvent. In addition to these solvent, glycol ester series solvent such as ethylene glycol monomethyl ether acetate, PMA (propylene glycol monomethyl ether acetate), diethylene glycol monobuthyl ether acetate, diethylene glycol monoethyl ether acetate are selectable as soluble solvent.

Here, "STR conc 710 black (product name)" includes insoluble solvent and soluble solvent, and the ink composition is obtained by adding at predetermined ratio of carbon black and dilution solvent to the STR conc 710 black (product name).

In this embodiment, the ratio of soluble solvent to insoluble solvent is determined so that the convexo-concave pattern is not spoiled by the soluble solvent included in the solvent during the predetermined period of time. Here, the predetermined period of time is from the coating of the ink composition on the plastic plate 1 to the removal of the solvent by drying from the ink composition.

If the percentage of the soluble solvent among the solvent becomes high, as shown in FIG. 2C, the degree of the erosion of the fine groove 2 of the plastic plate 1 that is caused as a result of the dissolution by the soluble solvent becomes high, when forming the ink coating 3 by removing the solvent by drying from the ink composition coated on the plastic plate 1.

In this case, the smoothness of the contact interface between the plastic plate 1 and the ink coating 3 is spoiled and the fine groove 2 of the plastic plate 1 is dissolved. Thereby, the incident light incoming from the front-side surface 1a of the plastic plate 1 is diffused within the plastic plate 1 before reaching to the ink coating 3.

In this case, since the amount of the light, which is directed to the front-side surface 1a of the plastic plate 1, is decreased, the visibility of the convexo-concave pattern (pattern of spin line or hairline) which consists of fine grooves 2 become worse.

Here, it has been verified through the experiments that the visibility becomes worse if the fine groove 2 of the plastic plate 1 is dissolved more than 0.5 micrometer in the thickness direction of the plastic plate 1. So, in this embodiment, the average ratio of the soluble solvent to the insoluble solvent (soluble solvent/insoluble solvent) is determined to equal to or below 0.39, more preferably to equal to or below 0.36.

Here, in addition to pigment, binder, soluble solvent, and insoluble solvent which are described above, the ink composition may include an additive, e.g. a dispersant and stabilizer, other dilution solvent for adjusting the viscosity, or so on.

This invention will be explained in more detail with reference to the example.

The visibility of the convexo-concave pattern and the resistance of the ink coating 3 are tested with respect to each of the decorated printed matter. Here, each of the decorated printed matter is obtained by drying the ink composition which is covering the convexo-concave pattern on the rear-side surface 1b of the plastic plate 1 (polycarbonate plate).

The detail of each of the ink composition, the manufacturing method of each of the decorated printed matter, and the evaluation result are as follows.

[Preparation of Ink Composition A1]

The ink composition A1 is prepared by adding 5 parts by weight of the dilution solvent (T475) in 50 parts by weight of the STR conc 710 black to dilute it. Here, the STR conc 710 black is a product name and is obtained from the SEIKO ADVANCE LTD.

The dilution solvent (T475) is a mixed solvent which contains the insoluble solvent (buthyl cellosolve or ethyl cellosolve) and soluble solvent (cyclohexanone) in a ratio of about 8:2.

The STR conc 710 black contains carbon black as colorant, and contains vinyl or acrylic resin as binder, and contains a mixture of buthyl cellosolve and cyclohezanone as solvent.

In the STR conc 710 black, the average blend ratio of colorant, binder, soluble solvent (cyclohezanone), and insoluble solvent (buthyl cellosolve or ethyl cellosolve) is 16.04:29.42:16.04:38.50.

The average ratio of soluble solvent to insoluble solvent (soluble solvent/insoluble solvent) in the ink composition A1 is 0.39, and the average ratio of carbon black to binder (carbon black/binder) in the ink composition A1 is 0.55.

[Preparation of Ink Composition A2]

The ink composition A2 is prepared by adding 3.3 parts by weight of the carbon black MA8 and 9.5 parts by weight of the dilution solvent (T475) in 50 parts by weight of the STR conc 710 black to dilute it. Here, the STR conc 710 black is a product name and is obtained from the SEIKO ADVANCE LTD, and the carbon black MA 8 is a product name and is obtained from MITSUBISHI CHEMICAL CORPORATION.

The average ratio of soluble solvent to insoluble solvent (soluble solvent/insoluble solvent) in the ink composition A2 is 0.36, and the average ratio of carbon black to binder (carbon black/binder) in the ink composition A2 is 0.77.

[Preparation of Ink Composition A3]

The ink composition A3 is prepared by adding 7.14 parts by weight of the carbon black MA8 and 23 parts by weight of the dilution solvent (T475) in 50 parts by weight of the STR conc 710 black to dilute it.

The average ratio of soluble solvent to insoluble solvent (soluble solvent/insoluble solvent) in the ink composition A3 is 0.33, and the average ratio of carbon black to binder (carbon black/binder) in the ink composition A3 is 1.03.

[Preparation of Ink Composition A4]

The ink composition A4 is prepared by adding 11.54 parts by weight of carbon black MA8 and 26 parts by weight of the dilution solvent (T475) in 50 parts by weight of the STR conc 710 black to dilute it.

The average ratio of soluble solvent to insoluble solvent (soluble solvent/insoluble solvent) in the ink composition A2 is 0.32, and the average ratio of carbon black to binder (carbon black/binder) in the ink composition A2 is 1.33.

[Preparation of Ink Composition B1]

The ink composition B1 is prepared by adding 5 parts by weight of the insoluble solvent (buthyl cellosolve) in 50 parts by weight of the STR conc 710 black to dilute it.

The average ratio of soluble solvent to insoluble solvent (soluble solvent/insoluble solvent) in the ink composition B1 is 0.33, and the average ratio of carbon black to binder (carbon black/binder) in the ink composition B1 is 0.55.

[Preparation of Ink Composition B2 to B4]

The ink compositions B2 to B4 are prepared by changing dilution solvent of the ink compositions A2 to A4 into buthyl cellosolve, respectively.

[Preparation of Ink Composition C3]

The ink composition C3 is prepared by adding 7.14 parts by weight of carbon black MA8 and 23 parts by weight of soluble solvent (cyclohexanone) in 50 parts by weight of the STR conc 710 black to dilute it.

[Preparation of Ink Composition D3]

The ink composition D3 is prepared by adding 7.14 parts by weight of carbon black MA8 and 23.0 parts by weight of soluble solvent (1,3,5-trimethylbenzene) in 50 parts by weight of the STR conc 710 black to dilute it.

[Preparation of Ink Composition E3]

The ink composition E3 is prepared by adding 7.14 parts by weight of carbon black MA8, 11.5 parts by weight of insoluble solvent (buthyl cellosolve), and 11.5 parts by weight of soluble solvent (cyclohexanone) in 50 parts by weight of the STR conc 710 black to dilute it.

[Preparation of Ink Composition R1]

The ink composition R1 is prepared by adding 5 parts by weight of dilution solvent (T475) in 50 parts by weight of the STR conc 765 process black to dilute it. Here, the STR conc process 765 process black is a product name and is obtained from the SEIKO ADVANCE LTD.

In the STR conc 765 process black, the average blend ratio of colorant, binder, soluble solvent (cyclohexanone), and insoluble solvent (ethylene glycol monobuthyl ether) is 2.69:29.57:19.35:48.39.

In this ink composition R1, the average ratio of soluble solvent to insoluble solvent (soluble solvent/insoluble solvent) is 0.38, and the average ratio of carbon black to binder (carbon black/binder) is 0.09.

[Preparation of Ink Composition R2]

The ink composition R2 is prepared by adding 5 parts by weight of dilution solvent (T475) in 50 parts by weight of the STR 710 black to dilute it. Here, STR 710 black is a product name and is obtained from the SEIKO ADVANCE LTD.

In the STR 710 black, the average blend ratio of colorant, binder, soluble solvent (cyclohexanone), and insoluble solvent (ethylene glycol monobuthyl ether) is 7.89:28.96:17.89:45.26.

In this ink composition R2, the average ratio of soluble solvent to insoluble solvent (soluble solvent/insoluble solvent) is 0.37, and the average ratio of carbon black to binder (carbon black/binder) is 0.27.

The dilution solvent (T475) used in the preparation of the ink composition R1, R2 is a mixed solvent which contains insoluble solvent (buthyl cellosolve or ethyl cellosolve) and soluble solvent (cyclohexanone) in a ratio of about 8:2.

[Preparation of Decorated Printed Matter]

The decorated printed matter is prepared by the steps of: forming a spin line pattern consist of fine grooves 2 on the rear-side surface 1b of the plastic plate 1; forming a pattern of the ink composition by coating on the spin line pattern of the rear-side surface 1b by the ink composition using a screen printing; and volatilizing (removing) the solvent from the ink composition by exposing under the certain drying condition. Thereby, the decorated printed matter provided with the ink coating 3 which covers the spin line pattern is prepared.

[Test of the Visibility of the Slineline Pattern]

The checking of the visibility of the spin line pattern when looking the prepared decorated printed matter from the front-side surface 1a (the surface to which the spin line pattern comprised of the extra-grooves is not formed) has been carried out.

Figure 3A:
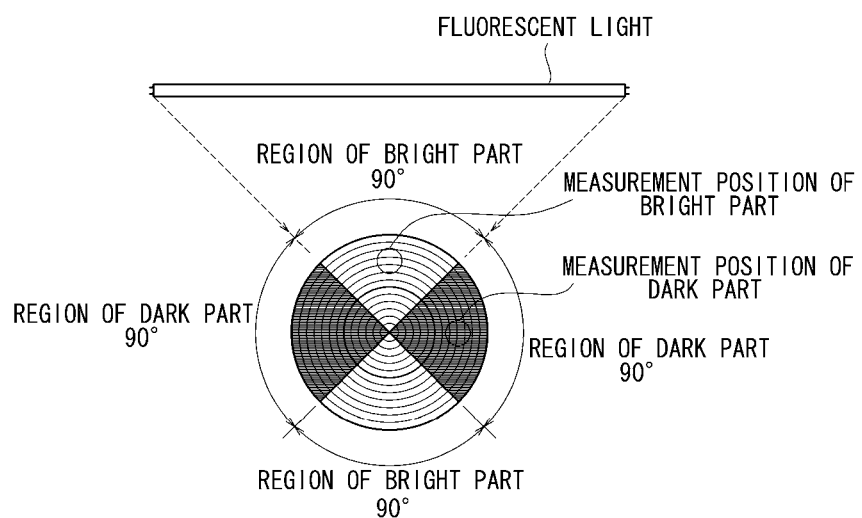
FIG. 3 is a schematic view of explaining the method for checking a visibility of the convexo-concave pattern.
Figure 3B:
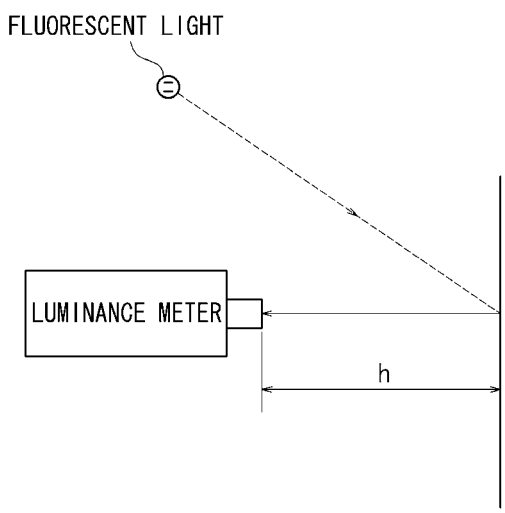

In FIG. 3, the method for carrying out the checking of the visibility of the spin line pattern is explained. FIG. 3A is a view of when looking the front-side surface 1a of the decorated printed matter 1 from the direction orthogonal to the front-side surface 1a. FIG. 3B is a view of when looking the decorated printed matter from the sideward.

When the light source (a fluorescent light) is positioned at the front-side surface 1a side of the decorate printed matter 1, to which the spin line pattern is formed, bright parts and dark parts of fan-shape are formed on the region of the spin line pattern in accordance with the relation between the direction of the light irradiated from the light source and the direction of the fine grooves 2.

In this embodiment, as shown in FIG. 3B, the location of each of the decorated printed matter and the fluorescent lamp are determined so that bright parts and dark parts of fan-shape are respectively formed in the range of 90 degree by viewing from the center of the spin line pattern. In this location, the checking of the visibility of the spin line pattern is made based on the contrast between the bright parts and the dark parts.

To be more precise, the amount of the reflected light (brightness value) from each of the bright parts and the dark parts is measured by the luminance meter which is positioned at the point distant h from the surface of the decorated printed matter in a vertical direction. Here, a color-difference and brightness meter of TOPCON CORPORATION is used. Then, the ratio of the brightness value of the bright part to that of the dark part (luminance ratio=brightness value of the bright part/brightness value of the dark part) is computed.

And finally, the visibility of the spin line pattern is checked by comparing the computed luminance ratio with the predetermined threshold value.

Here, when the spin line pattern is clearly visible, the difference of the brightness values between the bright part and the dark part becomes large and thereby the luminance ratio becomes large. On the contrary, when the spin line pattern is not clearly visible, the difference of the brightness values between the bright part and the dark part becomes small and thereby the luminance ratio becomes small. In this embodiment, therefore, it is judged that the visibility of the spin line pattern is good when color pigment comprises only black pigment and the luminance ratio is equal to or more than 3.5.

The surface resistance MΩ of the ink coating 3 of the decorated printed matter 1 is an average measured by a two-terminal and two-probe method (a terminal distance: 4.64 mm, a point diameter φ of the probe: 0.78 mm, and a suppress strength: 250 g).

[See Table 1 in Appendix to the Specification]

According to the above described experiments results which were carried out about each of the decorated printed matter prepared by using the ink compositions R1, R2, and A1 to A4, the luminance ratio is improved as the content of carbon black is increased and thereby the average of the ratio of carbon black/binder becomes large. In this case, the value of the luminance ratio significantly becomes large and thus the visibility of the spin line pattern is improved, when the ratio of carbon black/binder exceeds 0.77.

When the ratio of carbon black/binder exceeds 0.77, the particle of carbon black in the ink coating 3 is located with a high density in a line along the fine groove (see FIG. 2A). Thereby, a relatively flat reflection surface, which consists of particles of carbon black located with a high density along the fine groove, is formed on the region of the convexo-concave pattern on the rear-side surface of the plastic plate 1.

Thus, the light incoming into the plastic plate 1 from the front-side surface 1a is reflected at the reflection surface which is an interface between the plastic plate 1 and ink coating 3, and thereby almost all of incident light is directed to the front-side surface 1a. Thus, the visibility of the convexo-concave pattern is improved.

On the contrary, when the ratio of carbon black/binder is not more than 0.77, the content of the carbon black in the ink coating 3 becomes low (see FIG. 2B). In this case, since binder is also filled in the fine groove, the particle of carbon black cannot be located with a high density along the fine groove.

In this case, part of the light incoming into the plastic plate 1 is not reflected at the interface between the plastic plate 1 and ink coating 3 and thus the amount of the light directed to the front-side surface 1a of the plastic plate 1 is decreased. Thereby, the difference of the brightness values between the bright part and the dark part becomes small and the luminance ratio becomes small. Thus, the visibility of the spin line or hairline pattern becomes worse.

According to the comparison between A1 to A4 and B1 to B4, the average value of brightness at the dark parts becomes small when dilution solvent is changed from the mixed solvent (T475) into the insoluble solvent (buthyl cellosolve). In this case, since the ratio of brightness becomes larger than the case of the mixed solvent (T475), the visibility of the spin line pattern is improved.

The degree of the erosion of the fine grooves 2 of the plastic plate 1 that is caused as a result of the dissolution by the soluble solvent becomes high when forming the ink coating by drying the ink composition coated on the plastic plate, if the average content of the soluble solvent in the solvent of the ink composition is high. In this case, the amount of the light which is reflected at the interface between the plastic plate 1 and the ink coating 3 and is directed to the front-side surface 1a is decreased.

According to the observation of the extra-fine groove by a laser microscope VK-9700 of Keyence Corporation, it is observed that the amount of the light which is directed to the front-side surface 1a is decreased, when the fine groove 2 is dissolved for example more than 0.5 micrometer in the thickness direction and V-shaped cross-section of the fine groove 2 is distorted to the smooth convexo-concave shape.

Additionally, it is also observed that the amount of the light which is directed to the front-side surface 1a is decreased, when the smoothness of the slope 2a of the fine grooves 2 is damaged without the dissolution of fine grooves 2. In this case, the interface between the plastic plate 1 and ink coating 3 (the surface of the slope 2a) becomes a scabrous interface (surface), and the diffused reflection of the light incoming into the plastic plate 1 is caused at the scabrous interface (surface). Thereby, the amount of the light directed to the front-side surface 1a of the plastic plate 1 is decreased.

According to the comparison result between C3 and D3, there exists no remarkable difference in the visibility between cyclohexanone and 1,3,5-trimethylbenzene which are used as soluble solvent.

Also, according to the comparison result between C3 and E3, and between A3, B3, C3, D3, and E3, it is recognized that the ratio of brightness becomes large and the visibility of the spin line pattern is improved as the amount of the soluble solvent decreases.

As described above, in this embodiment, it is disclosed that the decorated printed matter which comprises: a plastic plate (resin substrate) 1 with a light permeability, the plastic plate is made of poly carbonate and is provided a convexo-concave pattern consists of a plurality of grooves in the form of spin line or hairline on a rear-side surface 1b thereof; an ink coating 3 covering the convexo-concave pattern; and the convexo-concave pattern is visible from a front-side surface 1a of the plastic plate 1; wherein the ink coating 3 is formed by removing a solvent from an ink composition coated on the rear-side surface 1b of the plastic plate, the ink composition includes black pigment as colorant and binder (vinyl or acrylic resin) as adhesive; the average ratio of soluble solvent to insoluble solvent (soluble solvent/insoluble solvent) is determined to equal to or below 0.39, more preferably determined to equal to or below 0.36; an average ratio of the carbon black to binder (carbon black/binder) is determined to equal to or more than 0.27, preferably determined within the range of equal to or more than 0.50 to equal to or not more than 1.40 (0.50≤C≤1.40), or more preferably determined within the range of equal to or more than 0.77 to equal to or not more than 1.33 (0.77≤C≤1.33); and thereby, the distribution of the black pigment in the ink coating 3 becomes the distribution by which an incident light incoming into the plastic plate from the front-side surface 1a of the plastic plate 1 is reflected at the interface between the plastic plate 1 and the ink coating 3.

According to this configuration, the particle of black pigment is compactly located in line along the groove 2 which forms the convexo-concave pattern on the rear-side surface 1b of the plastic plate 1. Thereby, a reflection surface of an incident light that comprises black pigment is formed on the rear-side surface 1b of the plastic plate 1.

Therefore, the incident light incoming into the plastic plate 1 from the front-side surface 1a thereof is certainly reflected at an interface between the plastic plate 1 and the ink coating 3, and is directed to the front-side surface 1a of the plastic plate 1. Thus, the convexo-concave pattern can be visible within the jet-black background by carbon black when looking the plastic plate 1 from the side of the front-side surface 1a.

The reflection at the interface between the plastic plate 1 and the ink coating 3 contributes to the improvement of the visibility of the convexo-concave pattern. Also, the visibility of the convexo-concave pattern varies largely according the incident direction of the incident light incoming into the plastic plate. Therefore, the convexo-concave pattern gives a different brightness in accordance with the directions looking, and thus the decorated printed matter which gives a sufficient metallic luster can be given.

In this case, the decorated printed matter which gives a sufficient metallic luster and visibility of the convexo-concave pattern can be obtained when the average ratio of carbon black to binder in the ink composition is determined within the range of equal to or more than 0.77 to equal to or not more than 1.33 (0.77≤C≤1.33).

In the embodiment, it is disclosed that the manufacturing method of the decorated printed matter that comprises the steps of:

forming a convexo-concave pattern by providing fine grooves 2 on the rear-side surface 1b of the plastic plate (resin substrate) 1 with a light permeability, the plastic plate 1 is made of poly carbonate;

coating the ink composition which include carbon black as colorant on the rear-side surface 1b of the plastic plate 1; and forming the ink coating 3 which covers the convexo-concave pattern by removing the solvent from the ink composition by drying; wherein the average ratio of soluble solvent to insoluble solvent (soluble solvent/insoluble solvent) is determined to equal to or below 0.39, more preferably determined to equal to or below 0.36;

an average ratio of the carbon black to binder (carbon black/binder (vinyl or acrylic resin)) is determined to equal to or more than 0.27, preferably determined within the range of equal to or more than 0.50 to equal to or not more than 1.40 (0.50≤C≤1.40), or more preferably determined within the range of equal to or more than 0.77 to equal to or not more than 1.33 (0.77≤C≤1.33), such that the distribution of the black pigment at the region of the convexo-concave pattern in the ink coating 3 becomes the distribution by which an incident light incoming into the plastic plate from the front-side surface 1a of the plastic plate 1 is reflected at the interface between the plastic plate 1 and the ink coating 3.

According to this configuration, the decorated printed matter, in which the convexo-concave pattern gives a different appearance in brightness that varies with the direction of viewing and which gives an appropriate metallic luster and a visibility, can be obtained.

Also, the ink composition includes the insoluble solvent (first solvent) and the soluble solvent (second solvent) as the dilution solvent; the solubility of the plastic plate is low in the insoluble solvent, and the solubility of the plastic plate is higher than that of the soluble solvent; the average ratio of soluble solvent to insoluble solvent (soluble solvent/insoluble solvent) is determined to equal to or below 0.39 such that the convexo-concave pattern which consists of fine grooves 2 is not spoiled during the period of time from the coating of the ink composition on the plastic plate 1 to the removal of the solvent from the ink composition by drying; insoluble solvent is at least one selected from among the group of buthyl cellosolve, ethyl cellosolve, cyclohexane, and ethyl cyclohexane; and soluble solvent is at least one selected from among the group of cyclohexanone, 1,3,5-trimethylbenzene, 1,2,4-trimethylbenzene, propylene glycol monomethyl ether acetate, isophorone, butyl acetate, toluene, xylene, cumene, and ethyl benzene.

According to this configuration, the damage of the convexo-concave pattern that is caused by the dissolution by the solvent when forming the ink coating 3 by removing the solvent from the ink composition by drying can be prevented.

Thereby, the decline in the visibility of the convexo-concave pattern and the decline in metallic luster of the decorated printed matter, which are caused due to the damage of the convexo-concave pattern, can be prevented.

Especially, the cross-section shape of the fine groove 2 is V-shaped; the width of the extra-fine groove 2 becomes wide towards the rear-side surface 1b of the plastic plate 1 in the thickness direction of the plastic plate 1; and the average angle θ of the slanting surface 2a with respect to the rear-side surface 1b of the plastic plate 1 is within the range of 0.5 degree to 36 degree. Here, each angle θ of respective slanting surface 2a is not necessarily within the above range, it is preferable that the angle θ of most (at least 60% or more) of the slanting surfaces 2a is with the above described range.

According to such configuration, the light, which enters into the plastic plate 1 from the vertical direction with respect to the front-side surface 1a of the plastic plate 1 or the direction close to vertical, is reflected by the fine groove (slanting surface 2a) and is directed to the front-side surface 1a.

In the decorated printed matter (name plate) with spin line or hairline pattern, in consideration of the actual usage, it is required that the pattern of spin line or hairline is visible when looking from the direction vertical to the front-side surface 1a. Therefore, the fine groove 2 is provided such that the incident light incoming from vertical direction side of the front-side surface 1a is reflected and is directed to the front-side surface 1a. In this embodiment, by determining the angle θ within the above described range, the visibility of the pattern of spin line or hairline in the decorated printed matter in usage can be improved.

In the above described embodiment, the ink composition which includes a mixture of vinyl resin and acrylic resin as binder that excels in adhesiveness with respect to the polycarbonate (PC) has been cited as example.

However, binder of the ink composition is not limited to that of the embodiment, for example, one of vinyl resin or acrylic resin may be used as binder. Here, polyvinyl chloride, polyvinyl acetate, polyvinyl alcohol, and polyvinyl butyral are adoptable as vinyl resin. A copolymer of acrylic acid, methacrylic acid, and ethyl acrylate or a copolymer of alkyl acrylate, alkyl methacrylate, glycidyl methacrylate, and styrene are adoptable as acrylic resin.

In the above described embodiment, 1,3,5-trimethylbenzene and cyclohexanone are cited as an example of the solvent to which the solubility of the polycarbonate (PC) is high. In addition to these solvent, toluene, xylene, cumene, 1,2,4-trimethylbenzene, butyl acetate, isophorone, and glycol ester series solvent such as ethylene glycol monomethyl ether acetate, PMA (propylene glycol monomethyl ether acetate), diethylene glycol monobuthyl ether acetate, diethylene glycol monoethyl ether acetate are selectable as soluble solvent, are adoptable as solvent.

In the above described embodiment, a transparent plastic plate with a light permeability is cited as an example. A semitransparent plastic plate with a light permeability or a plastic plate in which antireflection treatment is provided on the surface may be adoptable.

Also, in case of the embodiment, the ink composition is provided on the plastic plate by, for example, screen printing.

But the ink composition may be provided by offset printing, pad printing, painting, brush painting and so on.

Furthermore, in case of the embodiment, the pattern which consists of fine grooves is formed on the plastic plate by, for example, surface treatment (grinding). But, the pattern may be formed by press, thermoforming, thermal transfer, ultraviolet stamping and so on.

Additionally, in case of the embodiment, as an example of black pigment, carbon black has been cited. But, black lead (graphite) may be adopted as black pigment.

Furthermore, in case of the embodiment, as an example of colorant, black pigment has been cited. But, other pigment may be adoptable as colorant as long as the light transmissibility of the ink coating, which is obtained by removing a solvent from the ink composition coated on the plastic plate, is almost the same as that of the ink coating, which is obtained by removing a solvent from the ink composition including black pigment. For example, a pigment of blue or the like may be adoptable as colorant. Additionally, a mixture of pigments, for example a mixture of black and blue pigments, may be adoptable.

In case of the embodiment, as an example of the convexo-concave pattern, the convexo-concave pattern which consists of fine grooves 2, each rear-side ends of the fine groove 2 is sequentially connected to the rear-side end of adjacent fine grooves, has been cited.

But, the convexo-concave pattern, in which each fine groove 2 is provided at certain intervals so that the concave portion of the fine groove 2 that has a V-shaped cross-section and the convex portion between fine grooves 2 that has a reverse trapezoid-shaped cross-section are alternately disposed, may be adoptable.

Furthermore, in case of the embodiment, as an example of the ink composition, the ink composition prepared by using the STR 765 process black manufactured by SEIKO ADVANCE LTD. has been cited. But, the decorated printed matter may be prepared by using the ink composition which includes the above described carbon black (pigment), binder, solvent (soluble solvent and in soluble solvent) that are contained at a predetermined ratio.

In case of the embodiment, the amount of the solvent in the ink composition can be changed in accordance with the condition of the coating on the plastic plate of the ink composition while fixing each ratio of soluble solvent/insoluble solvent and carbon black/binder.

The modification example of the colorant of the ink composition (ink coating) will be explained as follows.

In the above embodiment, the colorant of the ink composition (ink coating) is a black pigment (carbon black). However, the colorant of the ink composition may be a mixture of a black pigment and other pigment (s) or may be the pigment (s) except a black pigment.

The detail of each of the ink composition used for providing the decorated printed matter is as follows.

Here, the composition of the ink composition A3 is the same as that of the ink composition A3 disclosed in Table 1 of the prior embodiment. Therefore, the explanation thereof will be omitted.

[Preparation of Ink Composition Ref]

The ink composition Ref is prepared by adding 7.5 parts by weight of the dilution solvent (T475) in 50 parts by weight of the STR conc 710 black (product name) to dilute it. Here, the STR conc 710 black is obtained from SEIKO ADVANCE LTD. The composition of the dilution solvent (T475) and the STR conc 710 black are respectively the same as that of the prior embodiment. So, the explanation of them will be omitted.

[Preparation of Compositions X1 to X4]

Each of the ink compositions X1 to X4 is prepared by: mixing the STR conc 710 black (product name) with the STR conc 440 blue (product name) in the ratio of Table 2; and adding 7.5 parts by weight of the dilution solvent (T475) to the mixture of the STR conc 710 black and the STR conc 440 blue. Here, the STR conc 440 blue is obtained from SEIKO ADVANCE LTD.

[Preparation of Ink Composition X5]

The ink composition X5 is prepared by: mixing 30 parts by weight of the STR conc 710 black (product name) with 20 parts by weight of the STR conc 440 blue (product name); adding 4.80 parts by weight of carbon black MA8 and 2.35 parts by weight of a phthalocyanine blue to mix with it; and adding 7.5 parts by weight of the dilution solvent (T475) to dilute it.

Here, a phthalocyanine blue is a blue pigment prepared by HOLBEIN WORKS, LTD. and the product name thereof is "oriental blue".

[Preparation of Ink Composition X6]

The ink composition X6 is prepared by: mixing 50 parts by weight of the STR conc 440 blue (product name) with 1.38 parts by weight of the phthalocyanine blue; and adding 7.5 parts by weight of the dilution solvent (T475) to dilute it.

Here, a phthalocyanine blue is a blue pigment prepared by HOLBEIN WORKS, LTD. and the product name thereof is "oriental blue".

[Preparation of Ink Composition X7]

The ink composition X7 is prepared by: mixing 50 parts by weight of the STR conc 440 blue (product name) with 9.62 parts by weight of the phthalocyanine blue; and adding 16.0 parts by weight of the dilution solvent (T475) to dilute it.

Here, a phthalocyanine blue is a blue pigment prepared by HOLBEIN WORKS, LTD. and the product name thereof is "oriental blue".

[Preparation of Ink Composition Y1]

The ink composition Y1 is prepared by: mixing 25 parts by weight of the STR conc 710 black (product name) with 25 parts by weight of the STR conc 495 violet (product name); and adding 7.5 parts by weight of the dilution solvent (T475) to dilute it. Here, the STR conc 495 violet is obtained from SEIKO ADVANCE LTD.

[Preparation of Ink Composition Y2]

The ink composition Y2 is prepared by: mixing 30 parts by weight of the STR conc 710 black (product name) with 20 parts by weight of the STR permanent red (product name); and adding 7.5 parts by weight of the dilution solvent (T475) to dilute it. Here, the STR permanent red is obtained from SEIKO ADVANCE LTD.

[Preparation of Ink Composition Y3]

The ink composition Y3 is prepared by: mixing 30 parts by weight of the STR conc 710 black (product name) with 20 parts by weight of the STR permanent red (product name); adding 8.25 parts by weight of carbon black MA8 and 2.35 parts by weight of a peony red to mix with it; and adding 12.05 parts by weight of the dilution solvent (T475) to dilute it.

Here, a peony red is a red pigment prepared by HOLBEIN WORKS, LTD. and the product name of it is "peony red".

[Preparation of Ink Composition Y4]

The ink composition Y4 is prepared by: mixing 50 parts by weight of the STR permanent red (product name) with 11.25 parts by weight of the peony red to mix with it; and adding 17.0 parts by weight of the dilution solvent (T475) to dilute it.

Here, a peony red is a red pigment prepared by HOLBEIN WORKS, LTD. and the product name of it is "peony red".

[Preparation of Ink Composition Z1]

The ink composition Z1 is prepared by: mixing 50 parts by weight of the STR conc 710 black (product name) with 2.11 parts by weight of carbon black MA8 and 5.51 parts by weight of a peony red to mix with it; and adding 7.5 parts by weight of the dilution solvent (T475) to dilute it.

[Preparation of Ink Composition Z2]

The ink composition Z2 is prepared by: mixing 50 parts by weight of the STR conc 710 black (product name) with 2.11 parts by weight of carbon black MA8 and 5.51 parts by weight of a phthalocyanine blue to mix with it; and adding 18.0 parts by weight of the dilution solvent (T475) to dilute it.

Here, a phthalocyanine blue is a blue pigment prepared by HOLBEIN WORKS, LTD. and the product name of it is "oriental blue".

[Preparation of Ink Composition Z3]

The ink composition Z3 is prepared by: mixing 50 parts by weight of the STR conc 710 black (product name) with 2.11 parts by weight of carbon black MA8 and 5.51 parts by weight of a phthalocyanine green to mix with it; and adding 18.0 parts by weight of the dilution solvent (T475) to dilute it.

Here, a phthalocyanine green is a green pigment prepared by Kabushikikaisha KUSAKABE and the product name of it is "phthalocyanine green".

[Preparation of Ink Composition Z4]

The ink composition Z4 is prepared by: mixing 50 parts by weight of the STR conc 710 black (product name) with 2.11 parts by weight of carbon black MA8 and 5.51 parts by weight of a permanent yellow lemon to mix with it; and adding 21.0 parts by weight of the dilution solvent (T475) to dilute it.

Here, a permanent yellow lemon is a yellow pigment prepared by Kabushikikaisha KUSAKABE and the product name of it is "permanent yellow lemon"

[Preparation and Evaluation of Decorated Printed Matter]

The preparation of the decorated printed matter using ink compositions of Ref, X1 to X7, Y1 to Y4, and Z1 to Z4 is carried out by the same manner as described in the prior embodiment.

Here, if the colorant includes the pigment other than the black pigment, the color density of the ink coating becomes small than that of the ink coating whose colorant is the black pigment only.

Therefore, the fluctuation of the luminance value obtained by the measurement becomes large, if the checking of the visibility of the spin line pattern is carried out based on the luminance ratio only that is used when the colorant is the black pigment. Thereby an accurate judgment becomes difficult.

In this embodiment, therefore, the visibility of the spin line pattern by visual checking is carried out in addition to the checking based on the luminance value obtained by a color-difference and brightness meter of TOPCON CORPORATION.

Here, the result by visual checking is shown in four levels (very good: ⊚, good: ○, no good: ∆, bad: x). Also the visual checking is carried out by the comparison with the visibility of the spin line pattern of the decorated printed matter, which was made using the ink composition Ref and the visibility thereof is very good: ⊚).

The main components about each of the ink compositions Ref, X1 to X7, Y1 to Y4, and Z1 to Z4 are disclosed together with the evaluation results.

[See Table 2 in Appendix to the Specification]

As can be seen from the results of Ref and X1 to X4 of Table 2, the luminance ratio drops gradually as the content of the blue pigment in the ink composition becomes high, and also the visibility of the spin line pattern becomes worse.

This is because the color density of the ink coating becomes lower than that of the ink coating which includes only black pigment as the content of the blue pigment becomes large.

According to the evaluation results about X2 and X5, the luminance ratio becomes high when the ratio of the pigment to the binder (pigment/binder) is made high while keeping the ratio of the blue pigment to the black pigment (pigment ratio) at a certain ratio. Also in this case, the visibility of the spin line pattern is improved and becomes almost the same as that of decorated printed matter which is obtained by using the ink compound Ref. This is because the color density of the ink coating becomes high as the ratio of the pigment to the binder (pigment/binder) is increased.

According to the evaluation results about Ref and X6, when the colorant of the ink composition (ink coating) is changed to the blue pigment from the black pigment, the luminance ratio and the visibility of the spin line pattern becomes worse than when the colorant is the black pigment only.

According to the evaluation result about X7, when the pigment/binder ratio is made high by adding the pigment, the luminance ratio and the visibility of the spin line pattern can be made almost the same as those of the ink coating which includes only black pigment as the colorant.

[See Table 3 in Appendix to the Specification]

According to the valuation results about Ref, Y1 and Y2 of Table 3, when the colorant of the ink composition is a mixture of black pigment with purple pigment or red pigment, the luminance ratio of the ink coating becomes worse than when the colorant is the black pigment only. Especially, the visibility of the spin line pattern becomes worse when the red pigment is mixed with the black pigment.

According to the comparison between evaluation results about Y2 and Y3, the luminance ratio and the visibility of the spin line pattern are improved when the pigment/binder ratio is made high by adding the pigment.

Thereby, it is expected that the luminance ratio and the visibility of the spin line pattern can be improved by making high the pigment/binder ratio in the case of the purple pigment.

As can be seen from the evaluation results about Ref, Y3 and Y4, when the colorant of the ink composition (ink coating) is changed to the red pigment from the black pigment, the luminance ratio and the visibility of the spin line pattern becomes worse than when the colorant is the black pigment only.

[See Table 4 in Appendix to the Specification]

According to the evaluation results about Ref and Z1 to Z4 of Table 4, when the ink composition is prepared by adding a red pigment to the STR conc 710 black (product name), the ink composition, which gives the luminance ratio equal to or more than that of the ink composition including the black pigment only as a colorant, can be obtained, by making the pigment/binder ratio high.

The same result is obtained when the ink composition is prepared by adding a blue pigment or a green pigment or a yellow pigment to the STR conc 710 black (product name), As described above, when the colorant of the ink composition (ink coating) is changed to the mixture of black pigment with the other pigment (blue pigment, purple pigment, red pigment, green pigment and yellow pigment), the decorated printed matter with a sufficient visibility of the spin line pattern can be obtained by controlling the pigment/binder ratio.

In the embodiment, a sufficient visibility of the spin line pattern can not be obtained when the black pigment is replaced with the red pigment. However, it is possible to provide the decorated printed matter with a sufficient visibility of the spin line pattern by adopting the red pigment which gives a high color density, even if the colorant consists of red pigment only. Also, the same holds for the other coloring pigment such as a green pigment, an orange pigment, and a yellow pigment.

Also, the other color pigments except the black pigment can be used as the colorant. The decorated printed matter with various color tones can be provided by adjusting the mixing ratio between the black pigment and the other pigment (a blue pigment, a red pigment, a purple pigment, a green pigment and yellow pigment) and or by adjusting the mixing ratio between other pigments.

Therefore, the decorated printed matter with a sufficient visibility of the spin line pattern and with a massive and expensive looking can be provided.

Here, even in the same color system, the color tone of each of the decorated printed matter differs each other according to the pigment.

A various type of the decorated printed matter with different color tone can be provided by changing the color pigment mixed with the black pigment or by mixing pigments of the same color system.

Thereby, the decorated printed matter with the visibility of the spin line pattern and with a massive and expensive looking can be provided, even such modifications.

The colorant of the ink composition (ink coating) is not limited to the above described embodiment and modification, a various type of coloring pigment can be adoptable.

Therefore, the ink composition may be provided by mixing a plurality of pigments except black pigment.

Furthermore, both organic pigment and inorganic pigment can be used as coloring pigment.

Also, a dye may be used as colorant instead of pigment as long as the color density of the ink coating is the same as that of the ink coating obtained from the coloring pigment which is disclosed in the above embodiment or modification.

Furthermore, the decorated printed matter may be provided with a reflection layer, which covers the concavo-convex pattern of the rear-side, so that the visibility of the spine line pattern is not spoiled even if the color density of the ink coating is low.

TABLE 1

| Ink composition | STR conc black | MA8 | Dilution solvent T475 | Insoluble solvent*3 | soluble solvent | Ratio (average) Soluble solvent/ insoluble solvent | CB/binder | CB/ink composition (%) | average brightness Bright part | dark part | luminance ratio | surface resistance MΩ |
|---|---|---|---|---|---|---|---|---|---|---|---|---|
| R1 | 50*4 | — | 5.0 | — | — | 0.38 | 0.09 | 2.45 | 1.81 | 1.26 | 1.44 | 20.0 |
| R2 | 50*5 | — | 5.0 | — | — | 0.37 | 0.27 | 7.17 | 2.71 | 1.79 | 1.51 | 20.0 |
| A1 | 50 | — | 5.0 | — | — | 0.39 | 0.55 | 14.58 | 4.36 | 2.12 | 2.06 | 0.54 |
| A2 | 50 | 3.33 | 9.5 | — | — | 0.36 | 0.77 | 18.06 | 4.87 | 1.46 | 3.34 | 0.103 |
| A3 | 50 | 7.14 | 23.0 | — | — | 0.33 | 1.03 | 18.92 | 7.17 | 1.01 | 7.08 | 0.049 |
| A4 | 50 | 11.54 | 26.0 | — | — | 0.32 | 1.33 | 22.32 | 7.30 | 1.29 | 5.66 | 0.029 |
| B1 | 50 | — | — | 5.0 | — | 0.33 | 0.55 | 14.58 | 4.36 | 1.35 | 3.23 | 11.5 |
| B2 | 50 | 3.33 | — | 11.7 | — | 0.26 | 0.77 | 18.06 | 5.90 | 0.90 | 6.53 | 0.595 |
| B3 | 50 | 7.14 | — | 23.0 | — | 0.19 | 1.03 | 18.92 | 7.65 | 0.96 | 7.93 | 0.054 |
| B4 | 50 | 11.54 | — | 26.0 | — | 0.18 | 1.33 | 22.34 | 7.13 | 1.31 | 5.45 | 0.049 |
| C3 | 50 | 7.14 | — | — | 23.0*1 | 1.61 | 1.03 | 18.92 | 2.30 | 2.22 | 1.04 | 0.045 |
| D3 | 50 | 7.14 | — | — | 23.0*2 | 1.61 | 1.03 | 18.92 | 3.10 | 2.41 | 1.29 | 0.030 |
| E3 | 50 | 7.14 | — | 11.5 | 11.5*1 | 0.63 | 1.03 | 18.92 | 5.10 | 1.34 | 3.82 | 0.019 |

*1: cyclohexanone,
*2: 1,3,5-trimethylbenzene,
*3: buthyl cellosolve (ethylene glycol monobuthyl ether),
*4: STR 765 process black,
*5: STR 710 black

TABLE 2

| | | Ref | A3 | X1 | X2 | X3 | X4 | X5 | X6 | X7 |
|---|---|---|---|---|---|---|---|---|---|---|
| Composition | STR conc 710 black | 50 | 50 | 40 | 30 | 20 | 10 | 30 | — | — |
| | STR conc 440 blue | — | — | 10 | 20 | 30 | 40 | 20 | 50 | 50 |
| | Black pigment (CB) | — | 7.14 | — | — | — | — | 4.80 | — | — |
| | Blue Pigment (Phthalocyanine blue) | — | — | — | — | — | — | 2.35 | 1.38 | 9.62 |
| | T475 | 7.5 | 23.0 | 7.5 | 7.5 | 7.5 | 7.5 | 16.0 | 7.5 | 16.0 |
| Content | Black pigment (g) | 7.5 | 14.64 | 6.0 | 4.5 | 2.4 | 1.2 | 9.30 | — | — |
| | Blue pigment (g) | — | — | 1.1 | 2.2 | 3.3 | 4.4 | 4.55 | 6.88 | 15.12 |
| | Binder (g) | 13.75 | 13.75 | 13.75 | 13.75 | 10.95 | 12.35 | 13.75 | 13.75 | 13.75 |
| Ratio | Pigment ratio (blue/black) | — | — | 0.18 | 0.49 | 1.38 | 3.67 | 0.49 | — | — |
| | Pigment/binder ratio | 0.55 | 1.06 | 0.52 | 0.49 | 0.52 | 0.45 | 1.01 | 0.50 | 1.10 |
| Evaluation results | Luminance ratio | 3.22 | 7.10 | 2.11 | 1.98 | 1.91 | 1.91 | 3.53 | 2.56 | 3.29 |
| | Bright part | 4.34 | 7.17 | 3.31 | 3.45 | 3.25 | 2.88 | 5.83 | 3.22 | 4.90 |
| | Dark part | 1.35 | 1.01 | 1.57 | 1.74 | 1.70 | 1.51 | 1.65 | 1.26 | 1.49 |
| | Visibility | ◎ | ◎ | ○ | ○ | Δ | Δ | ◎ | ○ | ◎ |

TABLE 3

| | | Ref | A3 | Y1 | Y2 | Y3 | Y4 |
|---|---|---|---|---|---|---|---|
| Composition | STR conc 710 black | 50 | 50 | 25 | 30 | 30 | — |
| | STR conc 495 violet | — | — | 25 | — | — | — |
| | STR permanent red | — | — | — | 20 | 20 | 50 |
| | Black pigment (CB) | — | 7.14 | — | — | — | — |
| | Red pigment (peony red) | — | — | — | — | 8.25 | 11.25 |
| | T475 | 7.5 | 23.0 | 7.5 | 7.5 | 12.0 | 17.0 |
| Content | Black pigment (g) | 7.5 | 14.64 | 3.75 | 4.50 | 4.50 | — |
| | Purple pigment (g) | — | — | 2.75 | — | — | — |
| | Red part (g) | — | — | — | 1.00 | 9.25 | 13.75 |
| | Binder (g) | 13.75 | 13.75 | 13.75 | 13.75 | 13.75 | 13.75 |
| Ratio | Pigment ratio (purple or red/black) | — | — | 0.73 | 0.22 | 2.06 | — |
| | Pigment/binder ratio | 0.55 | 1.03 | 0.47 | 0.40 | 1.00 | 1.00 |
| Evaluation results | Luminance ratio | 3.23 | 7.08 | 2.64 | 1.93 | 2.26 | 1.22 |
| | Bright part | 4.34 | 7.17 | 3.46 | 2.24 | 4.34 | 10.9 |
| | Dark part | 1.35 | 1.01 | 1.31 | 1.16 | 1.93 | 8.91 |
| | Visibility | ◎ | ◎ | ○ | Δ | ○ | X |

TABLE 4

| | | Ref | A3 | Z1 | Z2 | Z3 | Z4 |
|---|---|---|---|---|---|---|---|
| Composition | STR conc 710 black | 50 | 50 | 50 | 50 | 50 | 50 |
| | Black pigment (CB) | — | 7.14 | 2.11 | 2.11 | 2.11 | 2.11 |
| | Red pigment (peony redo) | — | — | 5.51 | — | — | — |
| | Blue pigment (phthalocyanine blue) | — | — | — | 5.51 | — | — |
| | Green pigment (phthalocyanine green) | — | — | — | — | 5.51 | — |
| | Yellow pigment (permanent yellow) | — | — | — | — | — | 5.51 |
| | T475 | 7.5 | 23.0 | 18.0 | 18.0 | 18.0 | 21.0 |
| Content | Black pigment (g) | 7.5 | 14.64 | 9.61 | 9.61 | 9.61 | 9.61 |
| | Red pigment (g) | — | — | 5.51 | — | — | — |
| | Blue pigment (g) | — | — | — | 5.51 | — | — |
| | Green pigment (g) | — | — | — | — | 5.51 | — |
| | Yellow pigment (g) | — | — | — | — | — | 5.51 |
| | Binder (g) | 13.75 | 13.75 | 13.75 | 13.75 | 13.75 | 13.75 |
| Ratio | Pigment ratio (Red or Blue or Green or Yellow/black) | — | — | 0.57 | 0.57 | 0.57 | 0.57 |
| | Pigment/binder ratio | 0.55 | 1.03 | 1.10 | 1.10 | 1.10 | 1.10 |
| Evaluation results | Luminance ratio | 3.23 | 7.08 | 5.24 | 4.39 | 4.95 | 3.45 |
| | Bright part | 4.34 | 7.17 | 7.33 | 7.86 | 6.22 | 6.07 |
| | Dark part | 1.35 | 1.01 | 1.40 | 1.79 | 1.26 | 1.76 |
| | Visibility | ◎ | ◎ | ◎ | ◎ | ◎ | ◎ |

What is claimed is:

1. A decorated printed matter comprising:
a resin substrate with a light permeability, the resin substrate has a convexo-concave pattern, which consists of a plurality of grooves, on a rear-side surface thereof; and
an ink coating covering the convexo-concave pattern;
wherein:
the convexo-concave pattern is visible from a front-side of the resin substrate,
the ink coating is formed by removing a solvent from an ink composition coated on the rear-side surface of the resin substrate,
the ink composition includes a coloring pigment as colorant and a binder as an adhesive,
the coloring pigment has a non-metallic appearance before being added to the ink composition, and wherein
a ratio of the coloring pigment to the binder is within a range of 0.27 to 1.40, such that the distribution of the coloring pigment in the ink coating becomes the distribution by which an incident light incoming into the resin substrate from the front-side surface thereof reflects at an interface between the resin substrate and the ink coating.

2. A decorated printed matter according to claim 1, wherein the decorated printed matter is a product of a process in which, before the solvent is evaporated therefrom, the ink composition includes a first solvent and a second solvent, a solubility of the resin substrate in the second solvent is higher than that of the resin substrate in the first solvent,
a ratio of the first solvent to the second solvent is determined to the ratio at which the convexo-concave pattern is not spoiled by the solvent during the period of time from the coating of the ink composition on the resin substrate to the removal of the solvent from the ink composition by drying.

3. A decorated printed matter according to claim 2, wherein the first solvent is at least one selected from among the group of buthyl cellosolve, ethyl cellosolve, cyclohexane, and ethyl cyclohexane,
the second solvent is at least one selected from among the group of cyclohexanone, 1,3,5-trimethylbenzene, 1,2,4-trimethylbenzene, propylene glycol monomethyl ether acetate, isophorone, butyl acetate, toluene, xylene, cumene, and ethyl benzene.

4. A decorated printed matter according to claim 1, wherein the coloring pigment is at least one of a black pigment, a blue pigment, a red pigment, a purple pigment, a green pigment and a yellow pigment.

5. A decorated printed matter according to claim 4, wherein the black pigment is a carbon black.

6. A decorated printed matter according to claim 2, wherein the coloring pigment is at least one of a black pigment, a blue pigment, a red pigment, a purple pigment, a green pigment and a yellow pigment.

7. A decorated printed matter according to claim 6, wherein the black pigment is a carbon black.

8. A decorated printed matter according to claim 3, wherein the coloring pigment is at least one of a black pigment, a blue pigment, a red pigment, a purple pigment, a green pigment and a yellow pigment.

9. A decorated printed matter according to claim 8, wherein the black pigment is a carbon black.

10. A decorated printed matter consisting of:
a resin substrate with a light permeability, the resin substrate has a convexo-concave pattern, which consists of a plurality of grooves, on a rear-side surface thereof; and
an ink coating covering the convexo-concave pattern;
wherein:
the convexo-concave pattern is visible from a front-side of the resin substrate,
the ink coating is formed by removing a solvent from an ink composition coated on the rear-side surface of the resin substrate,
the ink composition includes a coloring pigment as colorant and a binder as adhesive,
the printed matter generates a metallic luster when incident light is reflected from the ink coating through the resin substrate,
the coloring pigment has a non-metallic appearance before being added to the ink composition,
a rear surface of the ink coating spaced away from the resin substrate is uncovered and open to the environment, and
the distribution of the coloring pigment in the ink coating reflects an incident light, incoming into the resin substrate from the front-side surface thereof, from an interface between the resin substrate and the ink coating.

* * * * *